C. YOCCO.
SPECTACLES.

No. 190,530. Patented May 8, 1877.

WITNESSES:

INVENTOR:
C. Yocco
BY
ATTORNEYS.

UNITED STATES PATENT OFFICE.

CLEMENTE YOCCO, OF SAN JOSÉ, CALIFORNIA.

IMPROVEMENT IN SPECTACLES.

Specification forming part of Letters Patent No. 190,530, dated May 8, 1877; application filed March 12, 1877.

*To all whom it may concern:*

Figure 1:
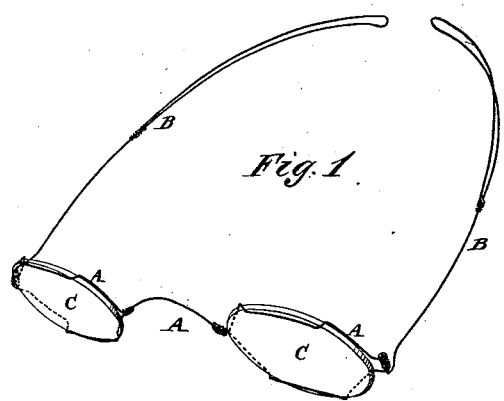
Figure 2:
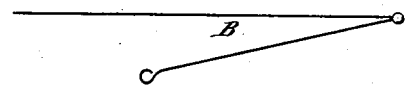
Figure 3:
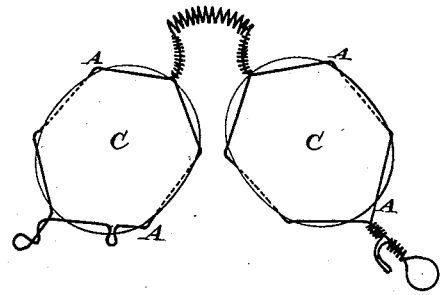
Figure 4:
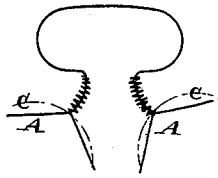

Be it known that I, CLEMENTE YOCCO, of San José, in the county of Santa Clara and State of California, have invented a new and useful Improvement in Spectacle and Eyeglass Frames, of which the following is a specification:

Figure 1 is a perspective view of a pair of spectacles illustrating my improvement. Fig. 2 is a detail view of a modification of the frame, showing a turned temple. Fig. 3 represents a pair of eyeglasses illustrating the invention. Fig. 4 represents a modification of the same.

Similar letters of reference indicate corresponding parts.

The object of this invention is to furnish frames for spectacles and eyeglasses which shall be simple in construction, inexpensive in manufacture, durable, and convenient, enabling the lenses to be readily put in and taken out when desired.

The invention consists in frames for spectacles and eyeglasses formed of a wire bent into hexagonal shape, with side bends at the angles to form seats for the lenses, having their middle part bent or coiled to form the nose-bridge, and having lugs or small loops formed upon the outer parts of the lens-seats, to serve as catches or handles, or to receive the side bars or temples, as hereinafter fully described.

A represents the lens-frames, which are made of a single piece of wire, the middle part of which is curved to form the nose bridge or arch, and the end parts are bent to form the loops to receive the lenses C. The lens-loops are made of hexagonal form to hold the lenses, and the angles between the sides have a side bend, so that one side of said hexagon may be upon one side of the edge of the lens and the adjacent side upon the opposite side of said edge, thus forming a seat for the lenses. The ends of the wire are then coiled around the end parts of the nose-arch.

In the case of spectacle-frames, ears or small loops are formed upon the outer ends of the lens-loops, into which are coiled the ends of the side bars or temples B of the frames. The outer parts of the side bars B may be turned back upon themselves, and their ends coiled around the middle part of said bars, as shown in Fig. 1, which style is especially intended for ladies' wear; or said side bars may be made with a turn-joint, as shown in Fig. 2.

In the case of eyeglasses, the wire at the outer ends of the lens-loops may be bent and coiled or twisted to form catches and handles for fastening them together when closed, and for convenience in handling them, as shown in Fig. 3.

The nose-bridge may be simply a curve of the wire, as shown in Figs. 1 and 4; or the wire may be coiled, as shown in Fig. 3.

Having thus described my invention, I claim as new and desire to secure by Letters Patent—

Frames for spectacles and eyeglasses formed of a wire bent into hexagonal shape, with side bends at the angles to form seats A for the lenses, having their middle part bent or coiled to form the nose-bridge, and having lugs or small loops formed upon the outer parts of the lens-seats to serve as catches or handles, or to receive the side bars or temples B, substantially as herein shown and described.

CLEMENTE YOCCO.

Witnesses:
FRANCIS STOCTZ,
JOSEPH H. SCULL.